United States Patent
Amaya et al.

[11] Patent Number: 5,426,560
[45] Date of Patent: Jun. 20, 1995

[54] ELECTRONIC COMPONENT

[75] Inventors: Keishirou Amaya; Kazuyoshi Uchiyama, both of Kyoto, Japan

[73] Assignee: Murata Manufacturing Co., Ltd., Nagaokakyo, Japan

[21] Appl. No.: 152,317

[22] Filed: Nov. 12, 1993

[30] Foreign Application Priority Data

Nov. 19, 1992 [JP] Japan .................................. 4-310026

[51] Int. Cl.⁶ .............................................. H01G 1/14
[52] U.S. Cl. .................... 361/309; 29/25.42; 361/310
[58] Field of Search ...................... 361/307, 308.1, 309, 361/313, 305, 310, 321.2, 321.3, 304, 303

[56] References Cited

U.S. PATENT DOCUMENTS

| | | | |
|---|---|---|---|
| 4,607,315 | 8/1986 | Wada et al. | 361/321.4 |
| 4,881,308 | 11/1989 | McLaughlin et al. | 361/305 |
| 5,021,921 | 6/1991 | Sano et al. | 361/309 |
| 5,162,973 | 11/1992 | Miyashita et al. | 361/308.1 |

FOREIGN PATENT DOCUMENTS

| | | | |
|---|---|---|---|
| 58-64017 | 4/1983 | Japan . | |
| 1152712 | 6/1989 | Japan | 361/321.2 |
| 0289231 | 11/1989 | Japan | 361/310 |
| 3-266404 | 11/1991 | Japan | 361/321.2 |
| 4-280616 | 10/1992 | Japan | 361/321.2 |
| 2224392 | 5/1990 | United Kingdom | 361/310 |

*Primary Examiner*—Bruce A. Reynolds
*Assistant Examiner*—Michael D. Switzer
*Attorney, Agent, or Firm*—Ostrolenk, Faber, Gerb & Soffen

[57] ABSTRACT

In an electronic component such as a multilayer ceramic capacitor having an external electrode which is formed on an outer surface of an element body provided with an internal electrode, an inner layer is formed by baking silver paste, for example, on only an end surface of the element body to be connected to the internal electrode, in order to provide a sufficient thickness to the external electrode for reducing dc resistance while avoiding a bad influence exerted by wet plating. An outer layer is formed by dry plating to cover the inner layer and an end portion of the element body. The outer layer is formed by a first layer of a nickel alloy, for example, and a second layer of silver, for example.

14 Claims, 3 Drawing Sheets

ELECTRONIC COMPONENT

BACKGROUND OF THE INVENTION

1. Field of the Invention

The present invention relates to an electronic component comprising an external electrode which is formed on an outer surface of an element body so as to be electrically connected to an internal electrode, and more particularly, it relates to an improvement in structure of such an external electrode.

2. Description of the Background Art

FIGS. 5 and 6 are enlarged sectional views showing parts of multilayer ceramic capacitors as conventional electronic components which are of interest to the present invention. Each of the multilayer ceramic capacitors comprises an element body 1 of ceramic, which is provided therein with an internal electrode 2 of a metal such as palladium, or silver/palladium, for example. An external electrode 3 is formed on an outer surface of the element body 1, to be electrically connected to an edge of the internal electrode 2. The conventional multilayer ceramic capacitors shown in FIGS. 5 and 6 are different in mode of formation of such external electrodes 3 from each other.

In the external electrode 3 shown in FIG. 3, a first layer 4 which is in contact with the edge of the internal electrode 2 and the outer surface of the element body 1 is formed by baking silver paste. A second layer 5 of nickel is formed thereon by wet plating, in order to protect the silver forming the first layer 1. Further, a third layer 6 of tin or solder is formed thereon by wet plating, in order to improve solderability.

In the external electrode 3 shown in FIG. 6, on the other hand, all of first, second and third layers 7, 8 and 9 are formed by dry plating such as sputtering. Such a method of forming an external electrode is described in Japanese Patent Application Laying-Open No. 58-64017 (1983), for example. In more concrete terms, the first, second and third layers 7, 8 and 9 are made of chromium, nickel or nickel/vanadium, and silver respectively. The total thickness of the first, second and third layers 7, 8 and 9 is about 1 $\mu$m.

Due to the second and third layers 5 and 6 which are formed by wet plating, however, the multilayer ceramic capacitor comprising the external electrode 3 shown in FIG. 5 encounters the following problems: (1) The plating solution may permeate into the element body 1 of ceramic, to cause insufficient insulation resistance of the as-obtained multilayer ceramic capacitor. (2) The ceramic forming the element body 1 may be electrically reduced during the plating operation. (3) The ceramic forming the element body 1 may be corroded or altered by the plating solution. (4) The plating may grow beyond the first layer 4, to reduce withstand voltage of the multilayer ceramic capacitor.

On the other hand, the multilayer ceramic capacitor shown in FIG. 6 can solve the aforementioned problems. Due to the small total thickness of the external electrode 3 of about 1 $\mu$m, however, this capacitor encounters the following problems: (1) The surface of the ceramic forming the element body 1 is inevitably irregularized, and the element body 1 may be partially exposed from the external electrode 3 if the surface is extremely irregularized. (2) The dc resistance of the electronic component tends to increase. This problem is particularly serious in a multilayer inductor. (3) The external electrode 3 may be broken upon supply of a large current. This problem is particularly serious in a multilayer varistor.

SUMMARY OF THE INVENTION

Accordingly, an object of the present invention is to provide an electronic component which can solve the aforementioned problems.

The present invention is directed to an electronic component, such as a multilayer capacitor, a multilayer inductor or a multilayer varistor, comprising an element body which is provided with an internal electrode, and an external electrode which is formed on an outer surface of the element body to be electrically connected to an edge of the internal electrode. In order to solve the aforementioned technical problems, the present invention comprises the following structure:

The external electrode includes an inner layer of a thick film which is in contact with the edge of the internal electrode and the outer surface of the element body, and an outer layer which is formed outside the inner layer by dry plating.

According to the present invention, the inner layer of a thick film provides a substantial thickness which is required for the external electrode, and the outer layer formed by dry plating provides properties such as solderability and heat resistance required for a surface of the external electrode.

Thus, according to the present invention, it is possible to solve all of the aforementioned problems caused in the prior art. Namely, it is possible to solve the problems of insufficient insulation resistance, reduction of the ceramic, corrosion or alteration of the ceramic and reduction of withstand voltage caused by growing of the plating, due to employment of no wet plating. Further, it is possible to solve the problems of partial exposure of the element body, increase of dc resistance and breakage of the external electrode, due to the sufficient thickness provided by the inner layer of a thick film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
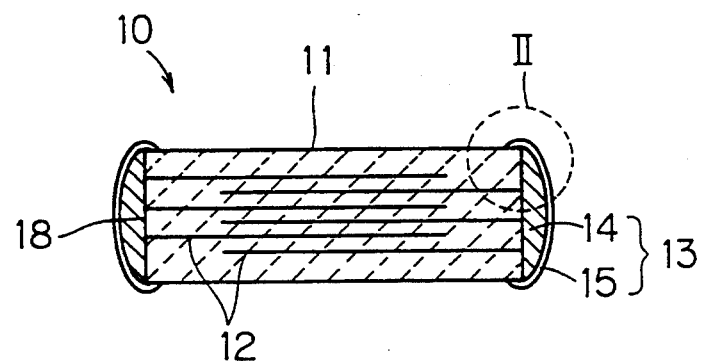
FIG. 1 is a sectional view showing a multilayer ceramic capacitor 10 according to an embodiment of the present invention.
Figure 2:
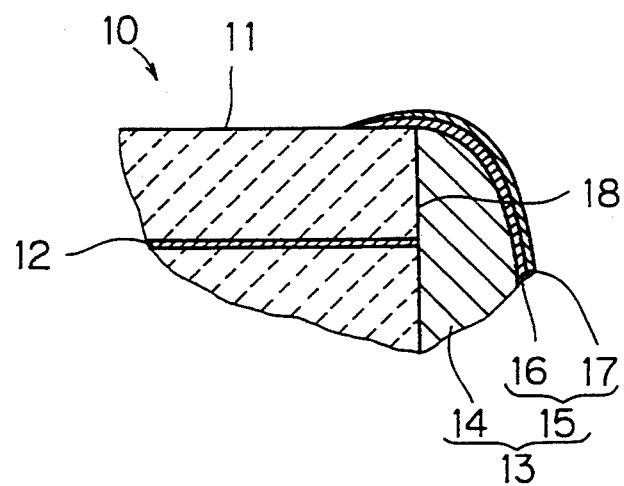
FIG. 2 is a sectional view showing a part II of the multilayer ceramic capacitor 10 appearing in FIG. 1 in an enlarged manner.

Referring to FIGS. 1 and 2, a multilayer ceramic capacitor 10 comprises an element body 11 of ceramic, and internal electrodes 12 of a metal such as palladium or silver/palladium, for example, are formed in the interior of this element body 11. External electrodes 13 are formed on outer surfaces of the element body 11, to be electrically connected to edges of the internal electrodes 12.

Each external electrode 13 includes an inner layer 14 which is in contact with the edges of the internal electrodes 12 and the outer surface of the element body 11, and an outer layer 15 which is formed outside the inner layer 14. While the outer layer 15 is in contact with the inner layer 14 according to this embodiment, at least a single other layer may be formed between the inner and outer layers 14 and 15. The inner layer 14 is formed by a thick film which is prepared by baking silver paste containing a glass component, while the outer layer 15 is prepared by dry plating.

According to this embodiment, the outer layer 15 has a two-layer structure, as shown in FIG. 2. Namely, a first layer 16 of the outer layer 15 which is in contact with the inner layer 14 is made of a nickel alloy, for example, and a second layer 17 which is formed outside the first layer 16 is made of silver.

Figure 3:
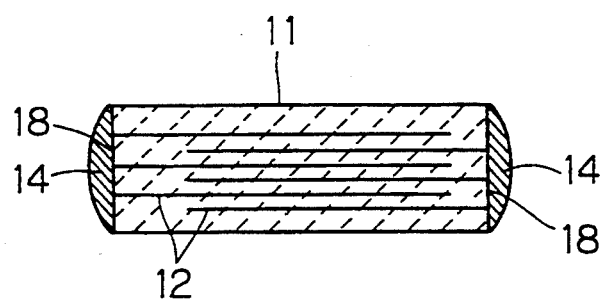
FIG. 3 is a sectional view illustrating an element body 11 shown in FIG. 1, which is provided on its outer surfaces with only inner layers 14.
Figure 4:
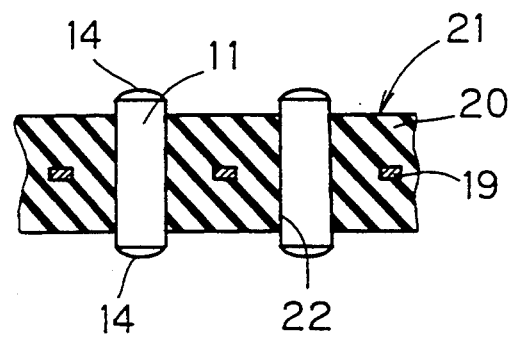
FIG. 4 is a sectional view showing the element body 11 which is held by a masking holder 21 for forming outer layers 15 by dry plating.
Figure 5:
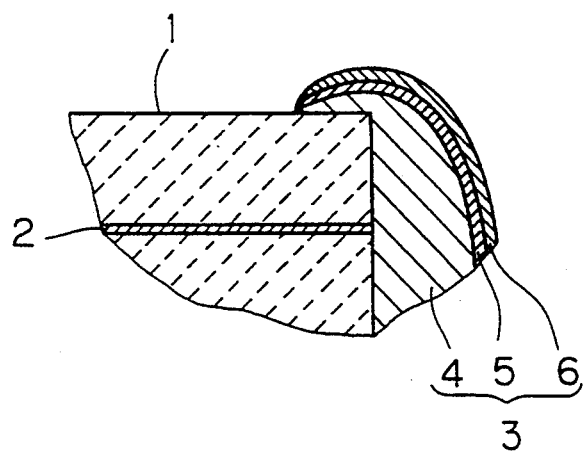
FIG. 5 is a partially enlarged sectional view showing a multilayer ceramic capacitor according to first prior art.
Figure 6:
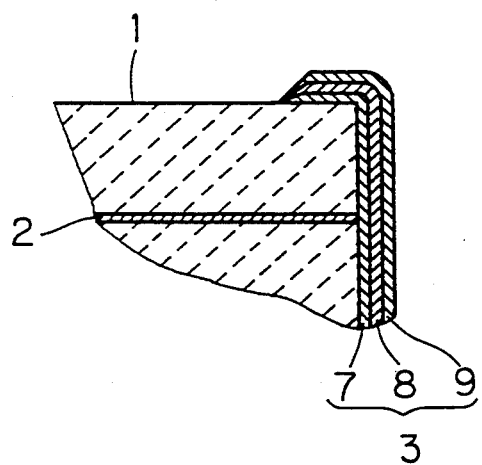
FIG. 6 is a partially enlarged sectional view showing another multilayer ceramic capacitor according to second prior art.

FIGS. 3 and 4 show a preferable method of forming the aforementioned inner and outer layers 14 and 15.

As shown in FIG. 3, inner layers 14 of at least 3 $\mu$m in thickness, for example, are first formed on outer surfaces of the element body 11, to be electrically connected to respective edges of the internal electrodes 12. The inner layers 14, which are formed by baking silver paste as hereinabove described, for example, may alternatively be formed by hardening thermosetting resin mixed with silver powder, for example. The inner layers 14 are preferably formed only on end surfaces 18 of the element body 11.

Then, a masking holder 21 of an elastic body 20 which is reinforced with stiffeners 19 is prepared as shown in FIG. 4. The elastic body 20 forming the masking holder 21 is provided with a plurality of receiving holes 22, each of which is adapted to elastically receive the aforementioned element body 11. The element body 11, which is provided with the inner layers 14 shown in FIG. 3, is inserted in the receiving hole 22, to be held by the masking holder 21. The element body 11 can be easily inserted in the receiving hole 22, since the inner layers 14 are formed only on the end surfaces 18 as hereinabove described. The element body 11 held by the masking holder 21 exposes only the inner layers 14 and end portions of the element body 11.

Then, dry plating is performed on the end portions of the element body 11 and the inner layers 14 to form the outer layers 15, i.e., the first and second layers 16 and 17 in order. Since the respective end portions of the element body 11 are subjected to such dry plating independently of each other, the masking holder 21 may have a thickness of exposing only one end portion of the element body 11. In this case, dry plating is first carried out on one end portion of the element body 11, which in turn is moved in the receiving hole 11 to expose another end portion, so that this end portion is then subjected to dry plating.

The inner layers 14 are formed only on the end surfaces 18 of the element body 11 as hereinabove described, whereby the inner layers 14 can be reliably covered with the outer layers 15 upon completion of such dry plating, as clearly understood from FIG. 2. Since the inner layers 14 are completely covered with the outer layers 15, particularly with the first layers 16 of a nickel alloy, it is possible to avoid the following disadvantage:

When the external electrodes 13 of the multilayer ceramic capacitor 10 are soldered, the solder as employed exudes the silver forming the second layers 17, and reaches the first layers 16 of a nickel alloy. If the inner layers 14 of silver are not completely covered with the first layers 16 of a nickel alloy, tin which is contained in the solder is diffused in the silver forming the inner layers 14, to disadvantageously swell the inner layers 14. When the inner layers 14 are completely covered with the first layers 16 as clearly shown in FIG. 2, it is possible to prevent occurrence of such a disadvantage.

While the above description of the embodiment illustrates specific metals forming the inner and outer layers 14 and 15 and the first and second layers 16 and 17 respectively, these materials may be replaced by other metals. For example, the inner layers 14 may be made of copper, nickel, zinc or an alloy thereof, in place of the silver. In the outer layers 15, further, the first layers 16 may be made of nickel in place of the nickel alloy, while the second layers 17 may be made of a silver alloy, tin or a tin alloy in place of the silver.

While the outer layers 15 which are formed outside the inner layers 14 have two-layer structures in the aforementioned embodiment, the outer layers 15 may simply have single-layer structures. In this case, it is possible to prepare the inner layers 14 from nickel, nickel/zinc or copper, while preparing the outer layers 15 from tin.

Although the above embodiment has been described with reference to a multilayer ceramic capacitor, the present invention is also applicable to another electronic component such as a multilayer inductor or a multilayer varistor, so far as the same comprises external electrodes which are formed on outer surfaces of an element body provided with internal electrodes to be electrically connected to the internal electrodes. Further, the present invention is not restricted to an electronic component having an element body of ceramic, but is also applicable to another electronic component having an element body of another material such as resin.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic component comprising:
    a) an element body including a pair of end surfaces and a pair of peripheral surfaces connecting said end surfaces, said element body being provided with an internal electrode in its interior, an edge of said internal electrode being exposed on at least one of said end surfaces of said element body; and
    b) an external electrode being formed on said end surfaces of said element body to be electrically connected to said edge of said internal electrode, said external electrode including:

1) an inner layer of a thick film being in contact with said edge of said internal electrode and being formed on only said end surfaces of said element body; and 2) an outer layer being formed outside said inner layer by dry plating such that said outer layer completely covers said inner layer while covering a portion of said peripheral surfaces.

2. An electronic component in accordance with claim 1, wherein said inner and outer layers are in contact with each other.

3. An electronic component in accordance with claim 2, wherein said outer layer comprises a first layer being in contact with said inner layer and a second layer being formed outside said first layer.

4. An electronic component in accordance with claim 3, wherein said inner layer contains one element selected from a group of silver, copper, nickel, zinc, and alloys containing said metals respectively, said first layer contains nickel or an alloy thereof, and said second layer contains one element selected from a group of silver, tin, and alloys containing said metals respectively.

5. An electronic component in accordance with claim 2, wherein said inner layer contains one element selected from a group of nickel, nickel/zinc and copper, and said outer layer contains tin.

6. An electronic component in accordance with claim 1, wherein said inner layer is formed by baking paste containing metal powder and a glass component.

7. An electronic component in accordance with claim 1, wherein said inner layer has a thickness of at least 3 μm.

8. An electronic component comprising:
a) an element body including a pair of end surfaces and a pair of peripheral surfaces connecting said end surfaces, said element body being provided with an internal electrode in its interior, an edge of said internal electrode being exposed on at least one of said end surfaces of said element body; and b) an external electrode being formed on said end surfaces of said element body to be electrically connected to said edge of said internal electrode, said external electrode including:

1) an inner layer of a thick film being in contact with said edge of said internal electrode and being formed on only said end surfaces of said element body, said inner layer being formed of one of silver and a silver alloy; and 2) an outer layer being formed outside said inner layer by dry plating such that said outer layer completely covers said inner layer while covering a portion of said peripheral surfaces.

9. An electronic component in accordance with claim 8, wherein said inner and outer layers are in contact with each other.

10. An electronic component in accordance with claim 9, wherein said outer layer comprises a first layer being in contact with said inner layer and a second layer being formed outside said first layer.

11. An electronic component in accordance with claim 10, wherein said first layer contains nickel or an alloy thereof, and said second layer contains one element said from a group of silver, tin, and alloys containing said metals respectively.

12. An electronic component in accordance with claim 9, wherein said outer layer contains tin.

13. An electronic component in accordance with claim 8, wherein said inner layer is formed by baking paste containing metal powder and a glass component.

14. An electronic component in accordance with claim 8, wherein said inner layer has a thickness of at least 3 μm.

* * * * *